United States Patent [19]

Nakamura

[11] Patent Number: 5,790,558
[45] Date of Patent: Aug. 4, 1998

[54] NUMERICAL CONTROL APPARATUS

[75] Inventor: Minoru Nakamura, Oshino-mura, Japan

[73] Assignee: Fanuc Ltd., Yamanashi, Japan

[21] Appl. No.: 776,073

[22] PCT Filed: May 24, 1996

[86] PCT No.: PCT/JP96/01404

§ 371 Date: Jan. 21, 1997

§ 102(e) Date: Jan. 21, 1997

[87] PCT Pub. No.: WO96/38016

PCT Pub. Date: Nov. 28, 1996

[30] Foreign Application Priority Data

May 24, 1995 [JP] Japan .................... 7-124673

[51] Int. Cl.$^6$ .................... G06F 11/00
[52] U.S. Cl. .................... 371/5.1; 371/5.5; 371/20.1
[58] Field of Search .................... 371/5.1, 5.5, 20.1, 371/35, 30; 379/133, 377

[56] References Cited

U.S. PATENT DOCUMENTS

| 4,924,496 | 5/1990 | Figa et al. ............... | 379/142 |
| 5,297,196 | 3/1994 | Yamada et al. ............ | 379/99 |

FOREIGN PATENT DOCUMENTS

| 4-167797 | 6/1992 | Japan . |
| 4-188298 | 7/1992 | Japan . |
| 6-269056 | 9/1994 | Japan . |

*Primary Examiner*—Phung M. Chung
*Attorney, Agent, or Firm*—Staas & Halsey

[57] ABSTRACT

A numerical control apparatus for making it easy to analyze a cause of the stop of the system due to an abnormality in an error detection communication or an error correction communication and to consider a countermeasures for eliminating the cause. In the numerical control apparatus which performs the error detection communication using an error detection code or the error correction communication using an error correction code, monitoring means monitors the name of a communication line on which an error has been detected or corrected in the received data, the number of communication failures and the time of the communication, to output the monitored information. Error detection/ correction status storing means observes and stores the information from the monitoring means for each communication line, to output the stored information as error detection/correction status information. Display means displays the information outputted from the error detection/ correction status storing means in response to a command from an operator.

10 Claims, 9 Drawing Sheets

NUMERICAL CONTROL APPARATUS

TECHNICAL FIELD

The present invention relates to a numerical control apparatus for communicating with external equipments by performing an error detection communication or an error correction communication, and more particularly to a numerical control apparatus for easily analyzing and eliminating a cause of the stoppage of the whole system due to a communication abnormality.

BACKGROUND ART

A numerical control apparatus for use in controlling a machining tool or the like transfers information by parallel or serial communications with various external units, such as a servo amplifier and an external I/O device, which are installed separately from the numerical control apparatus. In the parallel or serial communication, an information to be transferred is affected by an external noise penetrated into the communication line from outside to cause a communication failure depending on a magnitude and kind of the external noise. In order to improve the communication reliability and to transfer accurate information even in the presence of communication failures, the numerical control apparatus performs an error detection communication or an error correction communication so that normal communications are achieved. In the error detection communication, an error detection code such as a CRC code is added to data, and if an error is detected in the received data, a retransmission command is issued to receive the data again. In the error correction communication, an error correction code such as a hamming code is added to data, an error is not only detected in the received data but also corrected.

The number of communications may exceed an allowable retry number in the error detection communication or the error is not corrected in the error correction communication, depending on the magnitude of an external noise or the status in which the external noise is penetrated into the communication line. In such cases, it is inevitable to stop the system as the communication abnormality has occurred. In order to avoid the stoppage of the system, it is necessary to specify the communication line on which a communication failure has occurred, and to take a countermeasure, such as reducing of the noise penetrating into the communication line or the penetration rate of the noise, but it has been difficult even to consider the countermeasures.

DISCLOSURE OF INVENTION

It is an object of the present invention to make it easy to consider countermeasures for eliminating a cause of the stoppage of the system due to noise penetrated into a communication line, and also to make it possible to confirm effectiveness of the countermeasures.

According to a first aspect of the invention, a numerical control apparatus comprising: error detection communicating means for receiving data, to which an error detection code is added, through communication lines and for issuing a retransmission command to receive the data again when an error is detected in the received data; monitoring means for monitoring names of the communication lines on which the communicating means detects the error in the received data, the number of error detections and the time of the communication and for outputting the monitored information; error detection status storing means for observing and storing the information outputted from the monitoring means for each communication line and for outputting an error detection status for each communication line; and display means for displaying the error detection status outputted from the error detection status storing means for each communication line, in response to a command from an operator.

According to a second aspect of the invention, a numerical control apparatus comprising: error correction communicating means for receiving data, to which an error detection code is added, through communication lines and for correcting an error in the received data when the errors have been detected; monitoring means for monitoring names of the communication lines on which the error of the received data has been corrected, the number of error corrections and the time of the communication and for outputting the monitored information; error correction status storing means for observing and storing the information outputted from the monitoring means for each communication line and for outputting an error correction status; and display means for displaying the error correction status outputted from the error correction storing means for each communication line, in response to a command from an operator.

The error detection status storing means calculates the number of error detections and an error detection frequency for each communication line and outputs an error detection status including the calculation result after lapse of a predetermined time or when a predetermined number of communications terminate from the start of the observation. Likewise, the error correction status storing means calculates the number of error corrections and an error correction frequency for each communication line and outputs an error correction status including the calculation result after lapse of a predetermined time or when a predetermined number of communications terminate from the start of the observation. The number of error detections/corrections and the error detection/correction frequency may be repeatedly calculated after every lapse of the predetermined time or every time when the predetermined number of communications terminate. Since the data of the communication failure is summarized for display, it is made easy to consider the countermeasures.

The numerical control apparatus of the present invention further comprises parameter modifying means for modifying parameters for designating the predetermined time and the predetermined number and whether or not the repeated calculating is to be continued. Data regarding the cumulative number of communication failures and the communication failure frequency are also summarized for display.

The error detection/correction status clearly show an existence of external noise that has penetrated into the communication line but has not caused the stoppage of the system. By analyzing the error detection/correction status, it can be presumed that the communication line of high frequency or great number of communication failures is highly likely to cause a communication abnormality to make the system stop. Search is made on such communication line, and a possible source of the external noise is picked up. At that time, the time of occurrence of the communication failure may be a significant factor in presuming the external noise source. After effecting the countermeasures on the picked-up external noise source, the numerical control apparatus is operated to display the error detection/correction status again and the displayed status is compared with the previous result. With this procedure, the effectiveness of the countermeasures is confirmed. Eliminating the communication failures is very effective to avoid the abnormal communication and therefore the stoppage of the system is prevented by reducing the communication failures.

BEST MODE FOR CARRYING OUT THE INVENTION

Figure 1:
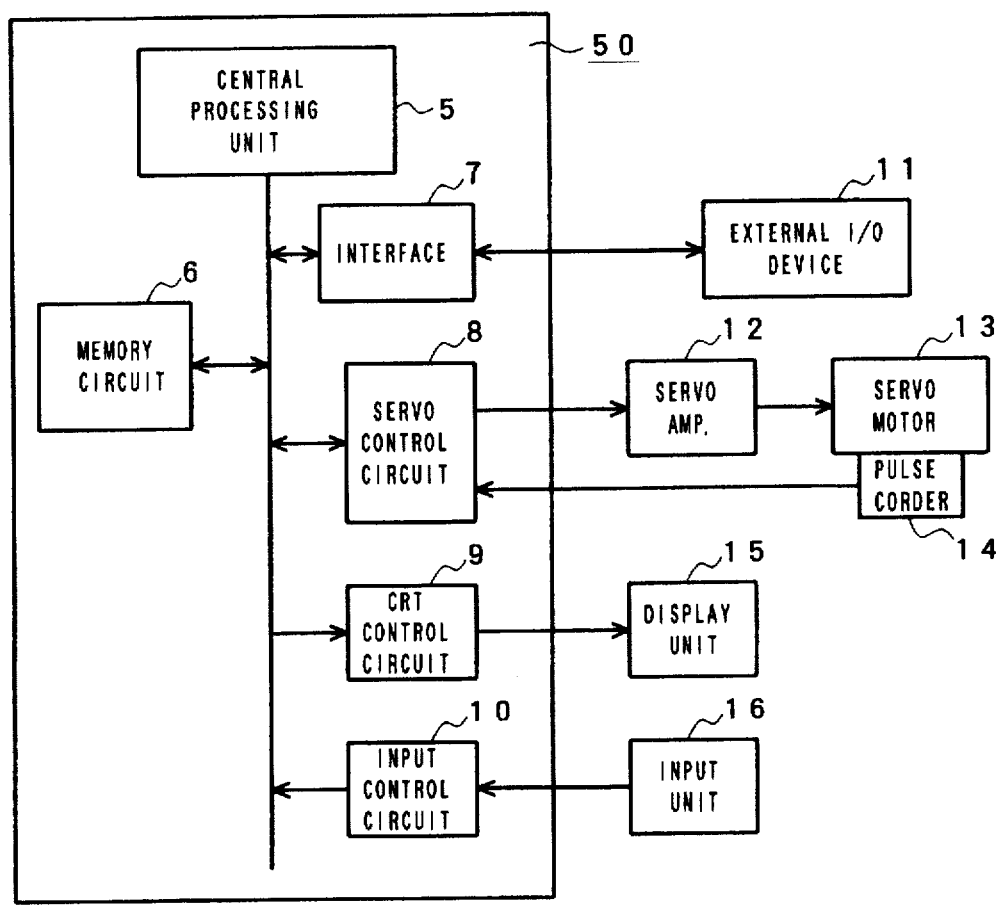
FIG. 1 is a block diagram showing a hardware architecture of a numerical control apparatus according to the present invention.

A numerical control apparatus as shown in FIG. 1 comprises a numerical control apparatus body 50, a display device 15 and an input device 16. The numerical control apparatus body 50 includes a central processing unit (CPU) 5, a memory circuit 6, an interface 7, a servo control circuit 8, a CRT control circuit 9, and an input control circuit 10. An external I/O equipment 11, a servo amplifier 12, a servomotor 13 and a pulse coder 14 are connected to the numerical control apparatus body 50. Communications take place between the interface 7 and the external I/O equipment 11, between the servo control circuit 8 and the servo amplifier 12, between the servo control circuit 8 and the pulse coder 14, between the CRT control circuit 9 and the display device 15 and between the input control circuit 10 and the input device 16, respectively, as indicated by the respective arrows in FIG. 1. An error detection communication or an error correction communication is performed, as the occasion demands. Each of these communications is performed in response to a command from the CPU 5 using information stored in the memory circuit 6. External noises penetrate into cables (communication lines) connecting the numerical control apparatus body 50 and various external equipments such as the external I/O device 11, etc. in FIG. 1 showing the hardware construction.

Figure 2:
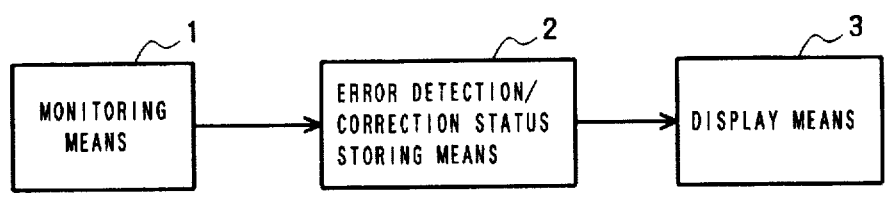
FIG. 2 is a functional block diagram of the numerical control apparatus relating to error detection communication and error correction communication.

The numerical control apparatus shown in FIG. 1 has a function of monitoring and displaying the error detection/correction status, which will be described using the block diagram of FIG. 2. In FIG. 2, monitoring means 1 monitors a communication status. In the error detection communication, the names of communication lines, the number of error detections and time of each communication are monitored. In the error correction communication, the names of communication lines, the fact of error correction and time of each communication are monitored and after termination of the individual communication, the monitored information is outputted. The number of error detections is expressed in terms of the number of retries which represents the number of retransmissions as errors have been detected in the received data, while the fact of error correction is expressed by a correction code which represents whether the error correction has been performed or not.

In the error detection communication, if the number of retries n is "0", it means that the first communication has been performed normally without any error. If the number of retries satisfies $1 \leq n \leq N$ (N: allowable number of retries), it means that resending of information has been performed as the errors due to communication failure have been detected and, as a result, communication has been carried out normally without errors at the n-th communication. Namely, it means that communication failure has occurred and the receiving of information has been repeated n times and the n-times communication is performed successfully without errors. If the received data still contains any error to keep the communication failure status when data transmission has been repeated N times, the communication terminates as it is deemed that a communication abnormality has occurred.

In the error correction communication, if no error correction has been made, it means that there is no error in the first communication and hence communication has carried out normally. If an error correction has been made, it means that an error has been detected in the first communication due to communication failure and has been corrected and, as a result, communication has carried out normally. In the case where the error could been corrected by the error correction, the communication terminates as it is deemed that a communication abnormality has occurred.

Error detection/correction status storing means 2 stores information which is outputted from the monitoring means 1 through individual communication lines, and calculates and stores a frequency of the error detection/correction, the number of communication failures and the number of non-failure communications for each communication line after every lapse of a predetermined time or after every termination of a predetermined number of communications. The information stored for every individual communication line is outputted as the error detection/correction status.

Display means 3 has a display push button and a display device, and displays the error detection/correction status outputted from the error detection/correction status storing means 2 for every individual communication line when the operator depresses the display push button.

Figure 3:
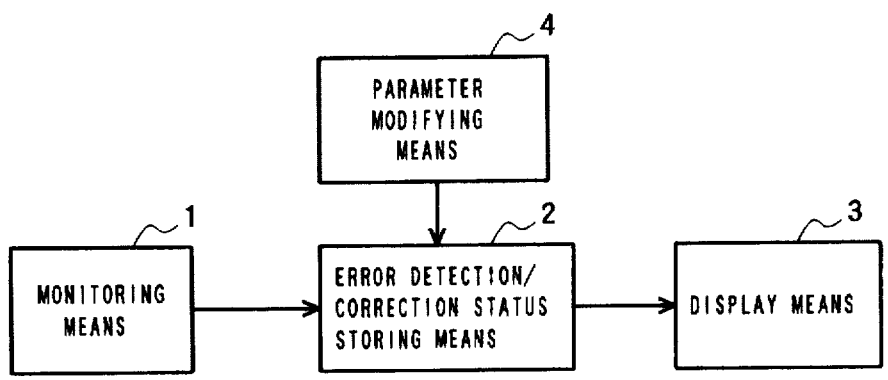
FIG. 3 is a functional block diagram showing a numerical control apparatus equipped with parameter modifying means.

FIG. 3 is a functional block diagram showing a numerical control apparatus which is equipped with parameter modifying means. In FIG. 3, monitoring means 1, error detection/correction status storing means 2 and display means 3 are identical with those described above.

Parameter modifying means 4 has a function of modifying the abovementioned predetermined time and the predetermined number of communications, a function of switching modes to cumulatively calculate and not to cumulatively calculate the number of failure communications and the number of non-failure communications, a function of clearing the cumulatively calculated information and a function of clearing information for every individual communication line. The functions of the parameter modifying means 4 are performed cooperatively with the error detection/correction status storing means 2.

The hardware of the monitoring means 1 and the error detection/correction status storing means 2 as shown in FIG. 2 is implemented by the CPU 5 and the memory circuit 6 as shown in FIG. 1. The hardware of the display means 3 is implemented by the CPU 5, the memory circuit 6, the CRT control circuit 9, the input control circuit 10, the display unit 15 and the input device 16 as shown in FIG. 1. The hardware of the parameter modifying means 4 in FIG. 3 is implemented by the CPU 5, the memory circuit 6, the input control circuit 10 and the input device 1 as shown in FIG. 1.

The software of the monitoring means 1, the error detection/correction status storing means 2, the display means 3 and the parameter modifying means 4 is stored in the memory circuit 6 and is executed by the CPU 5.

Figure 4:
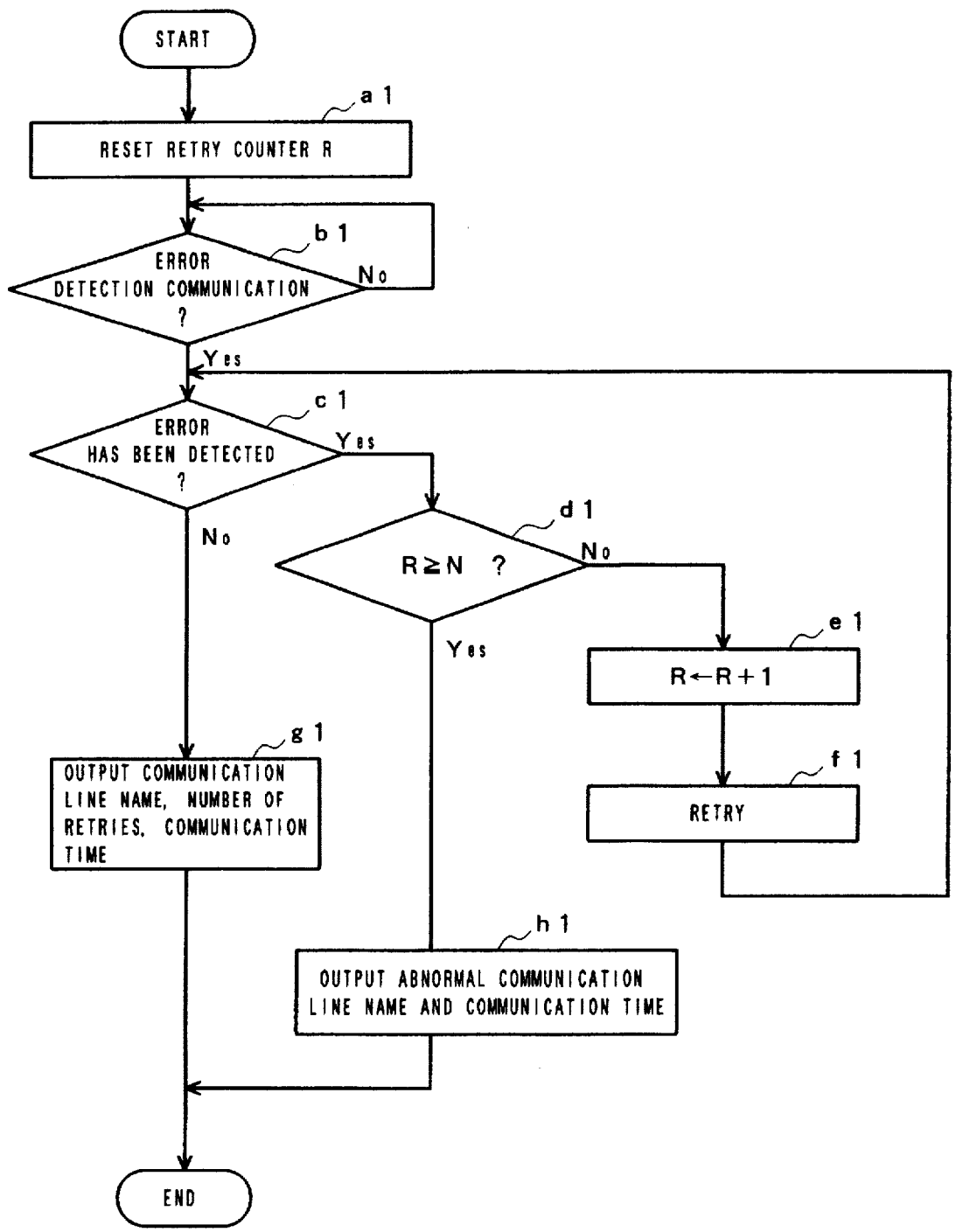
FIG. 4 is a flowchart of monitoring process in an error detection communication.

The monitoring process to be performed by the monitoring means 1 in the error detection communication will be described referring to the flowchart of FIG. 4.

Step a1: A retry counter R for counting the number of retransmissions is reset to initialize its count value to "0".

Step b1: It is monitored whether or not the error detection communication has started to wait for its start.

Step c1: The received data, to which an error detection code such as a CRC code is added, is analyzed when the error detection communication has started, and it is discriminated whether or not there is any error in the received data. If there is any error in the received data, the processing proceeds to Step d1 to complete the communication normally. If there is any error, the processing proceeds to Step d1.

Step d1: The value of the retry counter R is read and it is discriminated whether or not the number of the retries reaches an allowable number N for retry. If it reaches, the processing proceeds to Step h1 as it is deemed that the communication is abnormal, while if it does not reach, the processing proceeds to Step e1.

Step e1: "1" is added to the count value of the retry counter R.

Step f1: A retransmission command is issued to perform the communication again and the processing proceeds to Step c1.

Step g1: The name of communication line, the number of retries stored in the retry counter R, and the time of the communication are outputted.

Step h1: The name of the abnormal communication line and the time of the communication are outputted.

With the above steps, the monitoring process for the error detection communication terminates.

Figure 5:
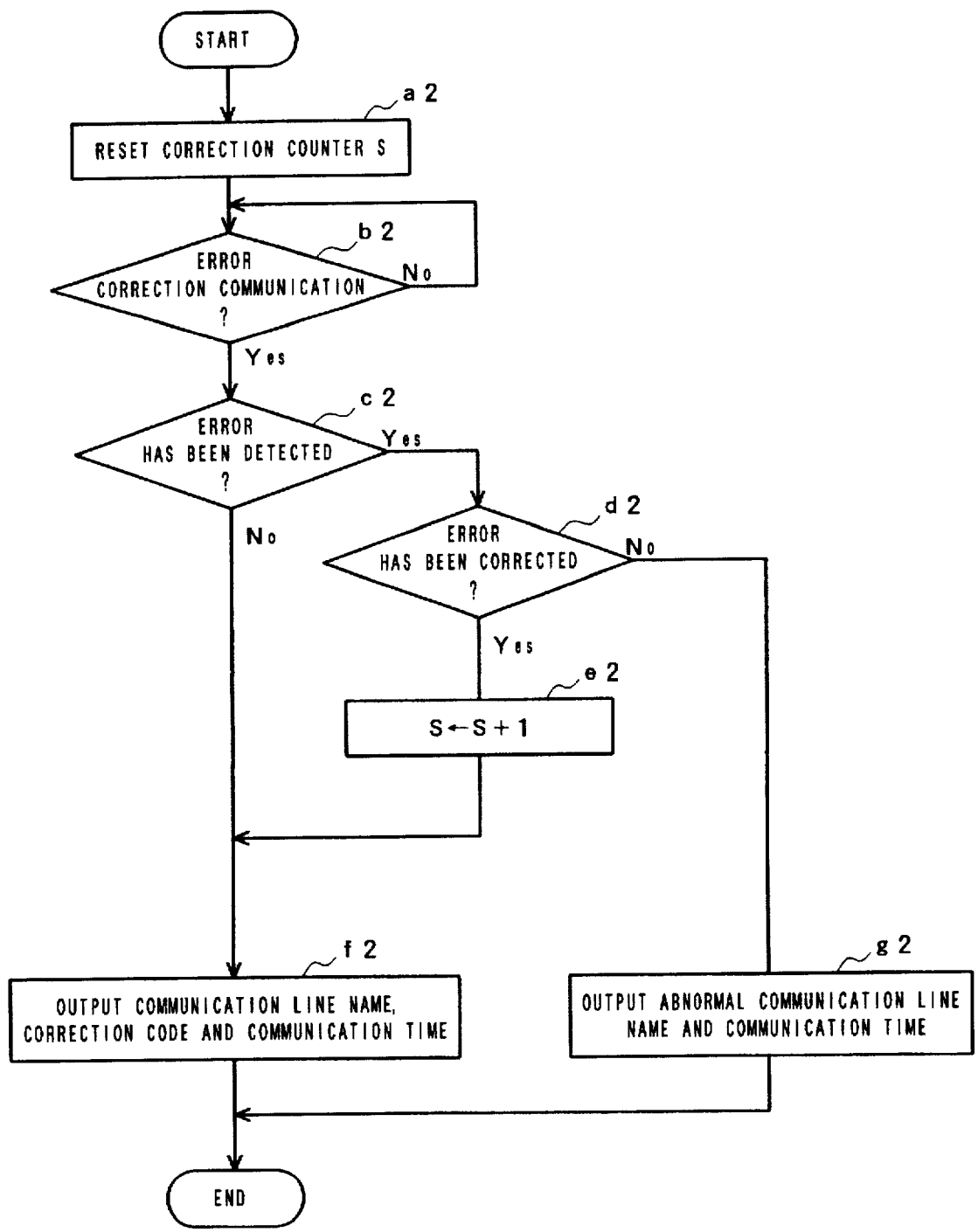
FIG. 5 is a flowchart of monitoring process in an error correction communication.

The monitoring process to be performed by the monitoring means 1 in the error correction communication will be described referring to the flowchart of FIG. 5.

Step a2: An error correction counter S is reset to initialize its count value to "0". The value of the correction counter S indicates a correction code representing the error correction status.

Step b2: It is monitored whether or not the error correction communication has started to wait until its start.

Step c2: The received data, to which an error correction code such as a hamming code is added, is analyzed when the error correction communication starts and it is discriminated whether or not there is any error in the received data. If there is no error in the received data, the processing proceeds to Step f2 to terminate the communication normally. If there is any error in the received data, the processing proceeds to Step d2.

Step d2: An error correction is executed and it is judged whether or not the error has been corrected. If the error is corrected the processing proceeds to Step e2, and if it is not corrected the processing proceeds to Step g2.

Step e2: The communication is completed normally and "1" is added to the count value of the error correction counter S.

Step f2: The name of communication line through which communication has carried out, the correction code stored in the error correction counter S, and the time of communication are outputted.

Step g2: The name of abnormal communication line and the time of communication are outputted, as a communication abnormality has occurred.

With the above steps, the monitoring process for the error correction communication is terminated. If the retransmission is to be performed when the error has not been corrected, the number of retries is counted likewise the error detection communication process as shown in FIG. 4.

Figure 6:
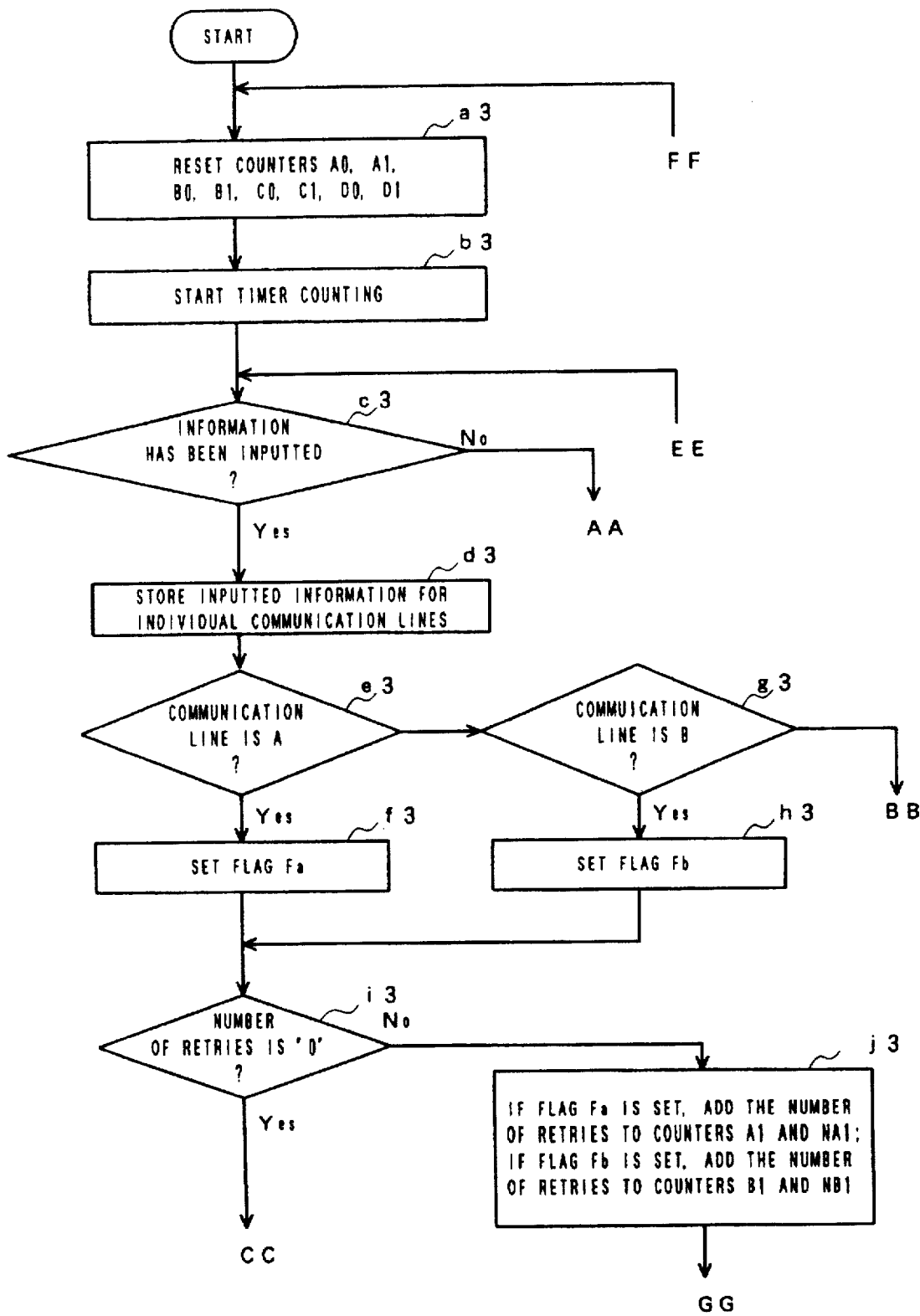
FIG. 6 is a part of a flowchart of an error detection and correction status storing process.
Figure 7:
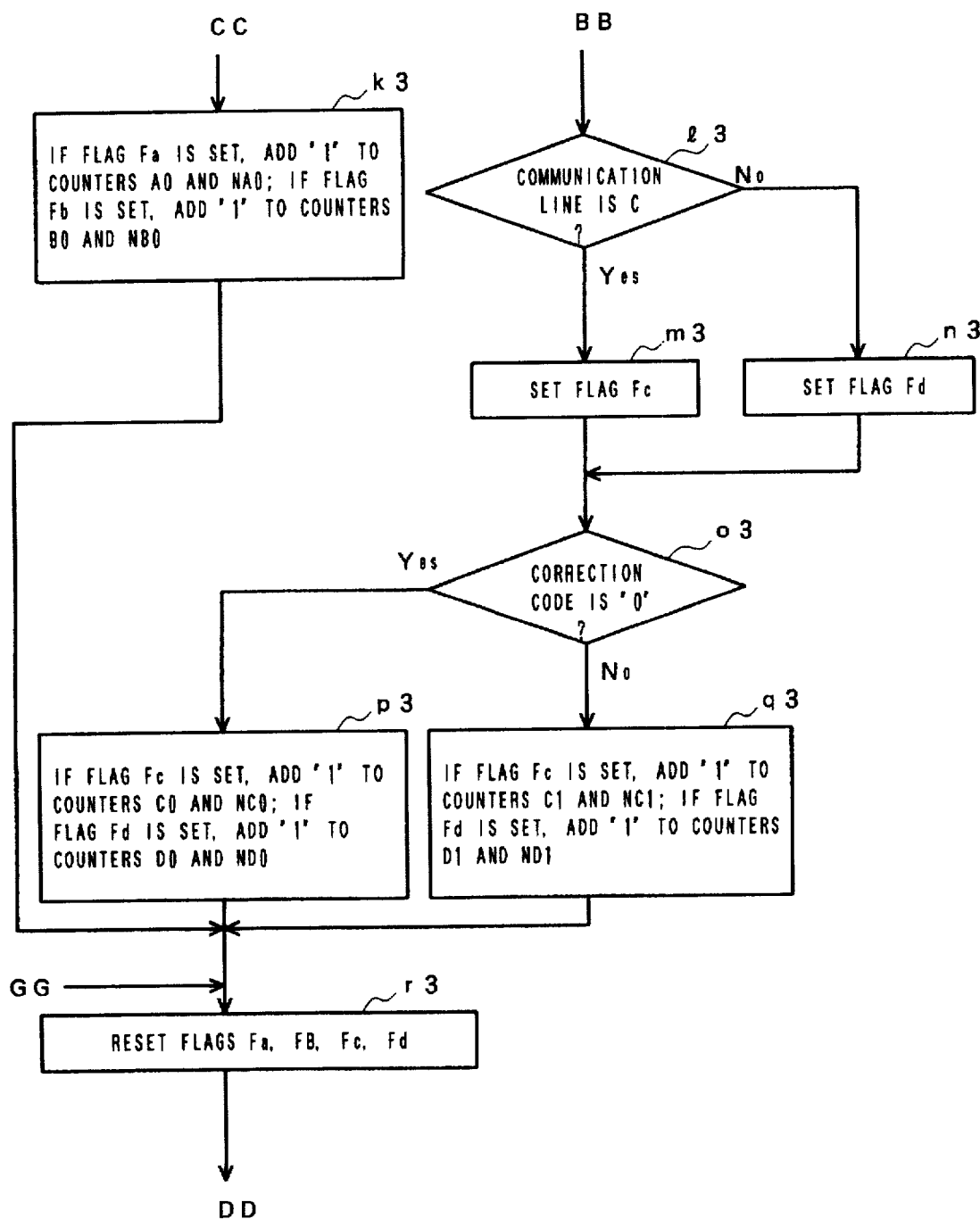
FIG. 7 is a continuation of the flowchart of FIG. 6.
Figure 8:
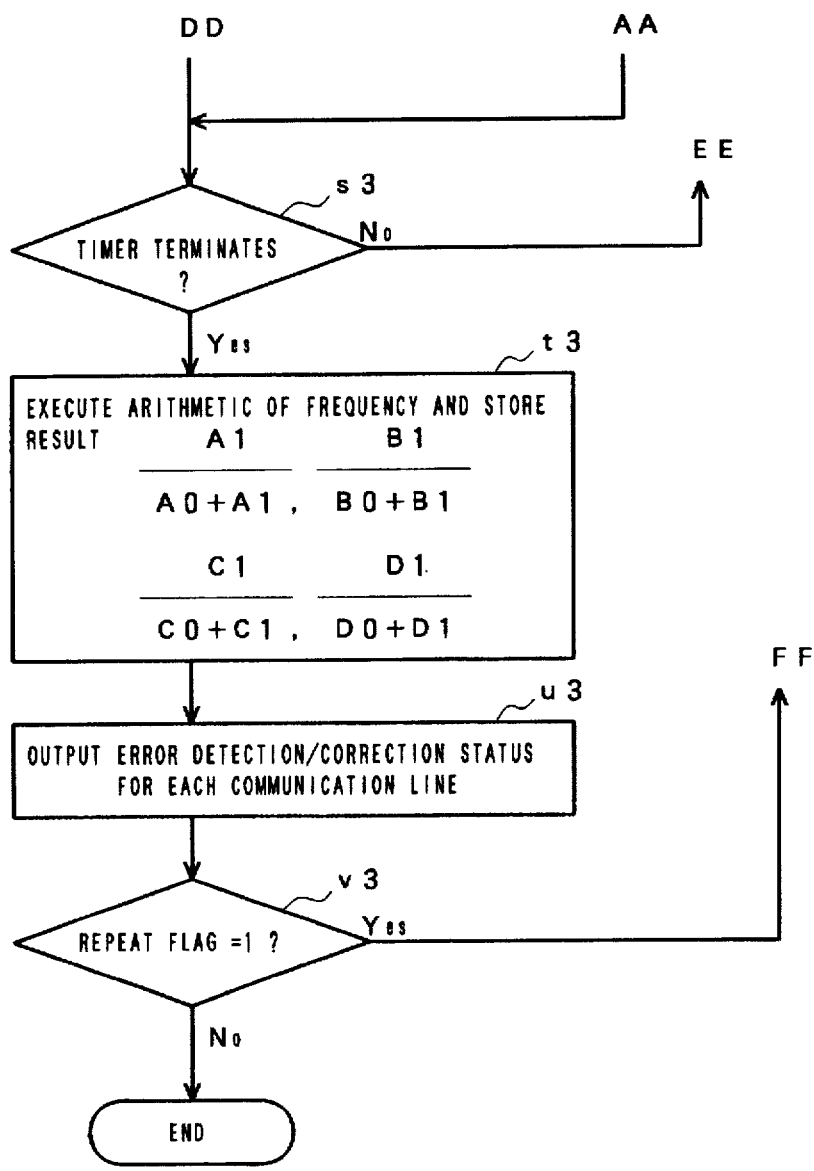
FIG. 8 is a continuation of the flowchart of FIG. 7.

The error detection/correction status storing process to be performed by the error detection/correction status storing means 2 will be described referring to the flowcharts of FIGS. 6, 7 and 8. In this example, the error detection communication is carried out in communication lines A and B, while the error correction communication is carried out in communication lines C and D.

Step a3: Counters A0, A1, B0, A1, C0, C1, D0 and D1 is reset to initialize their respective count values to "0".

Step b3: A timer is started for counting a period of time in which the communication status is observed.

Step c3: It is monitored whether or not an output signal from the monitoring means has been inputted. If it is inputted the processing proceeds to Step d3, and if is not inputted the processing proceeds to Step s3. In Step s3, if the timer has not counted a predetermined time, the processing returns to Step c3.

Step d3: Information, such as the name of communication line through which communication has carried out normally, the number of retries or the correction code, the name of communication line on which a communication abnormality has occurred, and the time of respective communication is stored in the memory for every individual communication line.

Step e3: It is discriminated whether or not the communication line is A. If it is A the processing proceeds to Step f3, and if it is not A the processing proceeds to Step g3.

Step f3: A flag Fa is set.

Step g3: It is discriminated whether or not the communication line is B. If it is B the processing proceeds to Step h3, and if it is not B the processing proceeds to Step I3.

Step h3: A flag Fb is set.

Step i3: It is discriminated whether or not the number of retries is "0". If it is "0" the processing proceeds to Step k3 in FIG. 7 via CC, and if it is not "0" the processing proceeds to Step j3.

Step j3: If the flag Fa is set, the number of retries is added to the count value of each of counters A1 and NA1, and if the flag Fb is set, the number of retries is added to the count value of each of counters B1 and NB1. The count values of the counters A1 and B1 represent the number of communication failures (the number of error detections in the communication data) in the respective communication lines A and B. The count values of the respective counters NA1 and NB1 represent the number of cumulative communication failures in the respective communication lines A and B.

Step k3: If the flag Fa is set, "1" is added to the count value of each of the counters A0 and NA0, and if the flag Fb is set, "1" is added to the count value of each of the counters B0 and NB0. The count values of the respective counters A0 and B0 represent the number of non-failure communications which has been carried out in the respective communication lines A and B. The count values of the respective counters NA0 and NB0 represent cumulative values of the number of non-failure communications which have been carried out in the respective communication lines A and B.

Step l3: It is discriminated whether or not the communication is C. If it is C, the processing proceeds to Step m3.

and if it is not C, namely the communication line is D, the processing proceeds to Step n3.

Step m3: A flag Fc is set.

Step n3: A flag Fd is set.

Step o3: The correction code (the count value of the correction counter) is discriminated. If it is "0", the processing proceeds to Step p3, and if it is not "0", the processing proceeds to Step q3.

Step p3: If the flag Fc is set, "1" is added to the count value of each of the counters C0 and NC0, and if the flag Fd is set, "1" is set to the count value of each of the counters D0 and ND0. The count values of the respective counters C0 and ND0 represent the number of data communications performed without correction in the respective communication lines C and D. The count values of the respective counters NC0 and ND0 represent the cumulative number of non-corrected communications in the respective communication lines C and D.

Step q3: If the flag Fc is set, "1" is added to the count value of each of the counters C1 and NC1, and if the flag Fd is set, "1" is added to the count value of each of the counters D1 and ND1. The count values of the respective counters C1 and D1 represent the number of failure communications with correction of communication data in the respective communication lines C and D. The count values of the respective counters NC1 and ND1 represent the cumulative number of failure communications in the respective communication line C, D.

Step r3: The flags Fa, Fb, Fc and Fd are reset and the processing proceeds to Step s3 in FIG. 8.

Step s3: It is discriminated whether or not the period of time for observing the communication status has reached the predetermined time. If it has not reached the predetermined time, the processing returns to Step c3 in FIG. 6 and repeats Steps c3 through s3.

Step t3: If the period of time reached the predetermined time, An arithmetic of communication failure frequency is executed. For the communication line A, the arithmetic of frequency is executed by calculating A1/(A0+A1) using the count values A0 and A1 of the counters A0 and A1. For the communication lines B, C and D, B1/(B0+B1), C1/(C0+C1) and D1 (D0+D1) are respectively calculated, likewise the communication line A. Further, the cumulative communication failure frequency is obtained by calculating NA1 (NA0+NA1), NB1/(NB0+NB1), NC1/(NC0+NC1) and ND1/(ND0+ND1).

Step u3: The names of communication lines on which the communication has carried out normally, the number of retries or the correction code, the names of communication lines on which the communication abnormality has occurred, and the time of the respective communications, which are stored in Step d3; the number of non-failure communications, the number of failure communications and the cumulative values of the respective numbers, which are stored in Steps k3, j3; the number of non-failure communications, the number of failure communications and the cumulative values of the respective numbers, which are stored in Steps p3, q3; and the names of communication lines, the failure frequency and the cumulative value thereof, which are stored in Step t3, are outputted for every individual communication line as the error detection/correction status.

Step v3: A repeat flag is checked. If it is "1", the processing returns to Step a3 in FIG. 6 and Steps a3 through v3 are repeated. If it is not "1",the processing terminates.

With the above steps, the error detection/correction status storing process is completed.

If the frequency of use of each communication line is not fixed and a different communication line is used in every observation, it would be better to consider the failure frequency more significant than the number of failures. In such case, it would be better to inspect the communication line of high failure-frequency rather than the communication line on which large number of failures occurred, when searching a source of noise penetrated into the communication line.

In the foregoing embodiment, the frequency of communication failure due to the noise from outside is calculated at every predetermined time. Alternatively, the communication failure frequency may be calculated every time when a predetermined number of communications are terminated. This predetermined number of communications are set to correspond to a predetermined number of machining processes by the numerical control apparatus, for example.

Figure 9:
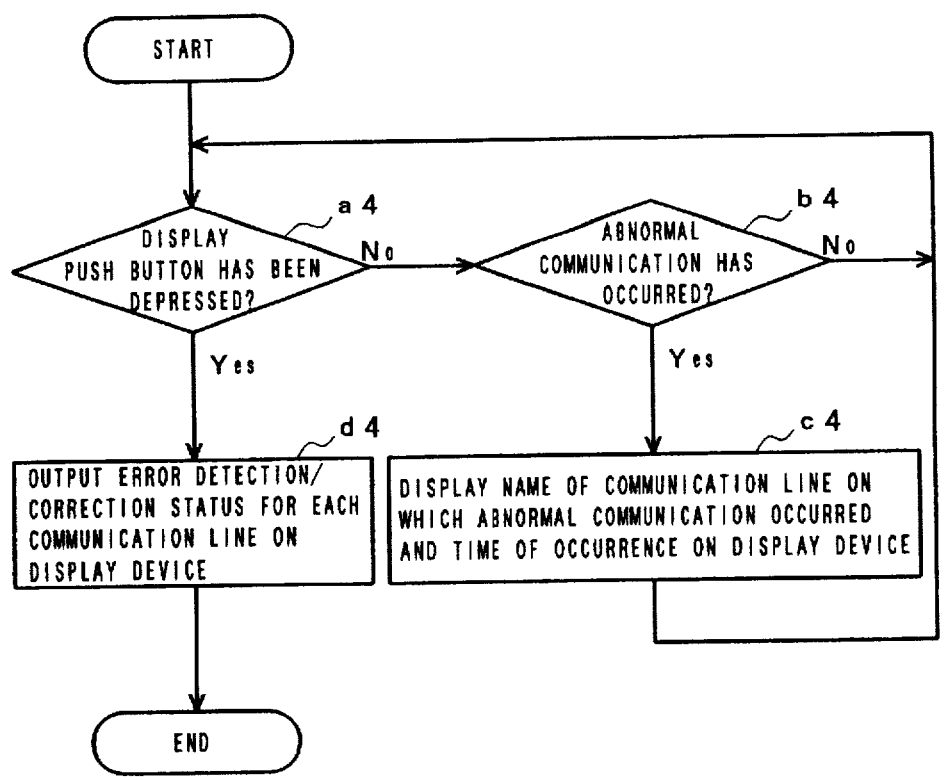
FIG. 9 is a flowchart of a display process.

The display processing to be performed by the display means 3 will be described referring to the flowchart of FIG. 9.

Step a4: It is monitored whether or not the display push button for displaying the error detection/correction status has been depressed by the operator. If it has been depressed the processing proceeds to Step d4, and if it has not been depressed the processing proceeds to Step b4.

Step b4: It is monitored whether or not a communication abnormality has occurred. If it has occurred, the processing returns to Step a4, and if it has not occurred the processing proceeds to Step c4.

Step c4:, The name of communication line on which a communication abnormality has occurred and the time of occurrence of communication abnormality are displayed on the display unit among the error detection/correction status information outputted from the error detection/correction status storing means 2, and then the processing returns to Step a4.

Step d4:, The names of communication lines on which normal communications have carried out, the number of retries or correction code, the number and the cumulative number of communication failures for each communication line, and the failure frequency and the cumulative failure frequency for each communication line are displayed on the display device among the error detection/correction status information outputted from the error detection/correction status storing means 2.

With the above steps, then the display processing is completed.

Figure 10:
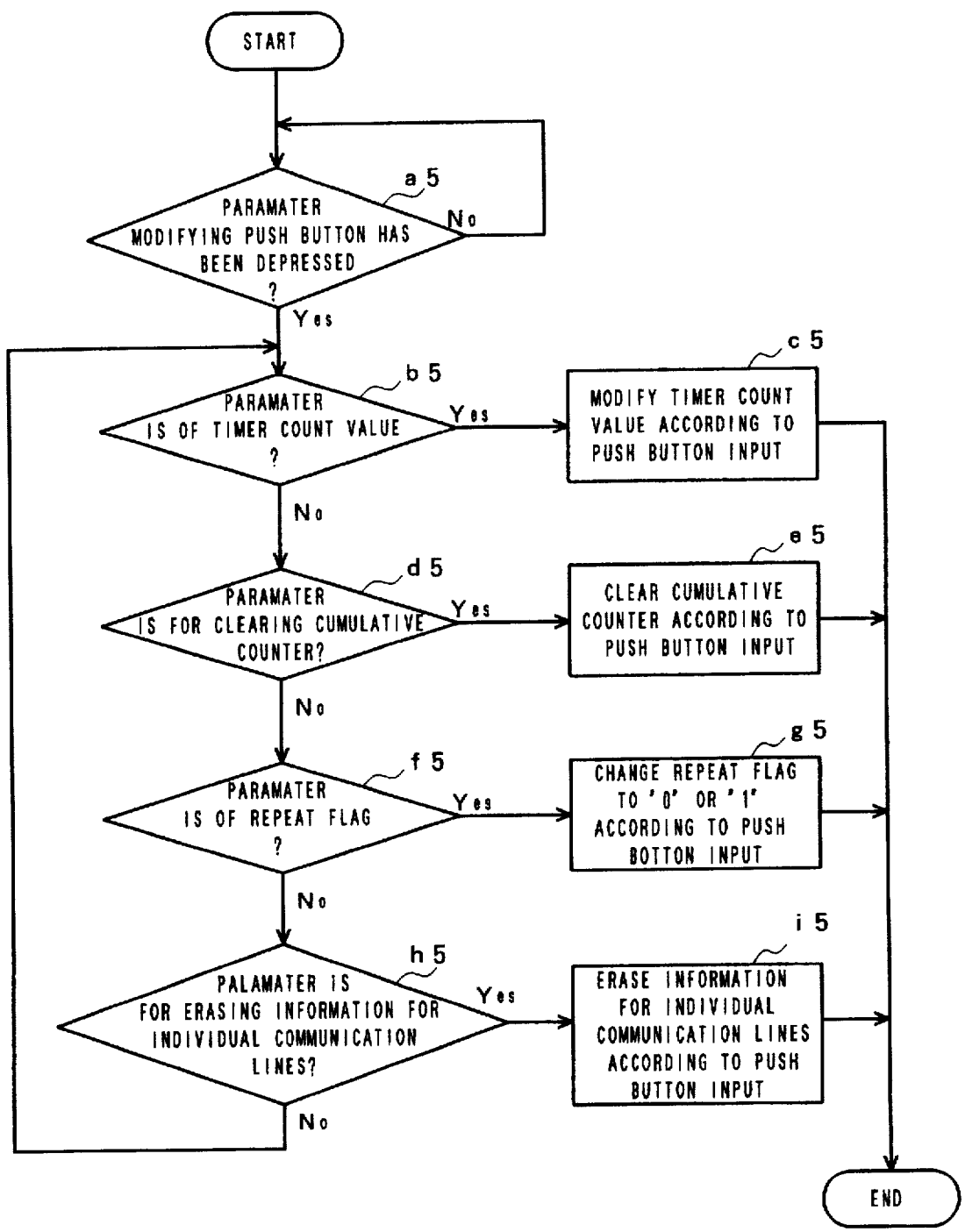
FIG. 10 is a flowchart of a parameter modifying process.

The parameter modifying processing to be performed by the parameter modifying means 4 will be described referring to the flowchart of FIG. 10. Every step of this processing will be executed on an interactive basis with an operator.

Step a5: It is monitored whether or not the parameter modifying push button has been depressed by the operator.

Step b5: It is discriminated whether or not the parameter to be modified is of a timer count value.

Step c5: A command is issued to the error detection/correction status storing means 2 to modify the timer count value according to a value inputted by the operator, thereby modifying the timer count value.

Step d5: It is discriminated whether or not the parameter to be modified is of clearing the cumulative counters (counters NA0, NA1; NB0, NB1; NC0, NC1; ND0, ND1).

Step e5: A command is issued to the error detection/correction status storing means 2 to clear the cumulative counters, thereby clearing the cumulative counters.

Step f5: It is discriminated whether or not the parameter to be modified is of a repeat flag.

Step g5: A command is issued to the error detection/correction status storing means 2 to set the repeat flag to "0" or "1" according to a value "0" or "1" inputted by the operator, thereby setting the repeat flag to "0" or "1".

Step h5: It is discriminated whether or not the parameter to be modified is of deleting information for individual communication lines. If it is not of deleting information for individual communication lines, the processing proceeds to Step b5.

Step i5: A command is issued to the error detection/ correction status storing means 2 to delete the information for individual communication lines, thereby erasing the information for every individual communication lines.

With the above steps, the parameter modifying processing is completed.

According to the present invention, the error detection/ correction status is displayed on the display unit when the display push button is depressed by an operator. The error detection/correction status includes information, such as the number of retries and the number of error corrections for every communication line. This information relates to the processing actually executed in communication but could not be observed in the conventional art, so that the status of communication failures which have not resulted in an abnormal communication can be readily observed. By analyzing the communication failures for individual communication lines, the communication line which needs a countermeasure against noise from outside will be found. After taking a necessary countermeasure, the effect thereof can be checked by performing the error detection/correction communications and displaying the error detection/correction status again. Thus, the cause for the stop of the system due to noise penetrated into the communication line is analyzed and eliminated. Since the displayed information regarding the communication is not only a list of the individual information but also summarized as the communication failure frequency and the cumulative number of communication failures, it is made easier to consider the countermeasure and to confirm the effect of the countermeasure.

I claim:

1. A numerical control apparatus comprising:

error detection communicating means for receiving data, to which an error detection code is added, through communication lines and for issuing a retransmission command to receive the data again when an error is detected in the received data;

monitoring means for monitoring names of the communication lines on which said communicating means detects the error in the received data, the number of error detections and the time of the communication and for outputting the monitored information;

error detection status storing means for observing and storing the information outputted from said monitoring means for each communication line and for outputting an error detection status for each communication line; and display means for displaying the error detection status outputted from said error detection status storing means for each communication line, in response to a command from an operator.

2. A numerical control apparatus according to claim 1, wherein said error detection status storing means calculates the number of error detections and an error detection frequency for each comniunication line and outputs an error detection status including the calculation result after lapse of a predetermined time from a start of the observation.

3. A numerical control apparatus according to claim 2, wherein said error detection status storing means repeatedly calculates the number of error detections and the error detection frequency after every lapse of said predetermined time, said numerical control apparatus further includes parameter modifying means for modifying parameters for designating said predetermined time and whether or not the repeated calculation is to be continued.

4. A numerical control apparatus according to claim 1, wherein said error detection status storing means calculates the number of error detections and the error detection frequency for every individual communication line and outputs the error detection status including the calculation result when a predetermined number of communications terminate from a start of the observation.

5. A numerical control apparatus according to claim 4, wherein said error detection status storing means repeatedly calculates the number of error detections and the error detection frequency every time when said predetermined number of communications terminate, said numerical control apparatus further includes parameter modifying means for modifying parameters for designating said predetermined number and whether or not the repeated calculation is to be continued.

6. A numerical control apparatus comprising:

error correction communicating means for receiving data, to which an error detection code is added, through communication lines and for correcting an error in the received data when the errors have been detected;

monitoring means for monitoring names of the communication lines on which the error of the received data has been corrected, the number of error corrections and the time of the communication and for outputting the monitored information;

error correction status storing means for observing and storing the information outputted from said monitoring means for each communication line and for outputting an error correction status; and display means for displaying the error correction status outputted from said error correction storing means for each communication line, in response to a command from an operator.

7. A numerical control apparatus according to claim 6, wherein said error correction status storing means calculates the number of error corrections and an error correction frequency for each communication line and outputs an error correction status including the calculation result after lapse of a predetermined time from a start of the observation.

8. A numerical control apparatus according to claim 7, wherein said error correction status storing means repeatedly calculates the number of error detections and the error detection frequency after every lapse of said predetermined time, said numerical control apparatus further includes parameter modifying means for modifying parameters for designating said predetermined time and whether or not the repeated calculation is to be continued.

9. A numerical control apparatus according to claim 7, wherein said error correction status storing means repeatedly calculates the number of error corrections and the error correction frequency every time when said predetermined number of communications terminate, said numerical control apparatus further includes parameter modifying means for modifying parameters for designating said predetermined number and whether or not the repeated calculation is to be continued.

10. A numerical control apparatus according to claim 6, wherein said error correction status storing means calculates the number of error corrections and the error correction frequency for every individual communication line and outputs the error correction status including the calculation result when a predetermined number of communications terminate from the start of the observation.

* * * * *

UNITED STATES PATENT AND TRADEMARK OFFICE
CERTIFICATE OF CORRECTION

PATENT NO. : 5,790,558

DATED : August 4, 1998

INVENTOR(S) : Nakamura

It is certified that error appears in the above-indentified patent and that said Letters Patent is hereby corrected as shown below:

Col. 4, line 48, change "abovementioned" to --above-mentioned--.

Col. 6, line 39, change "13" to --$\ell$3--;
line 66, change "13" to --$\ell$3--.

Signed and Sealed this

Thirteenth Day of April, 1999

Attest:

Q. TODD DICKINSON

*Attesting Officer*

Acting Commissioner of Patents and Trademarks